Figure 1:
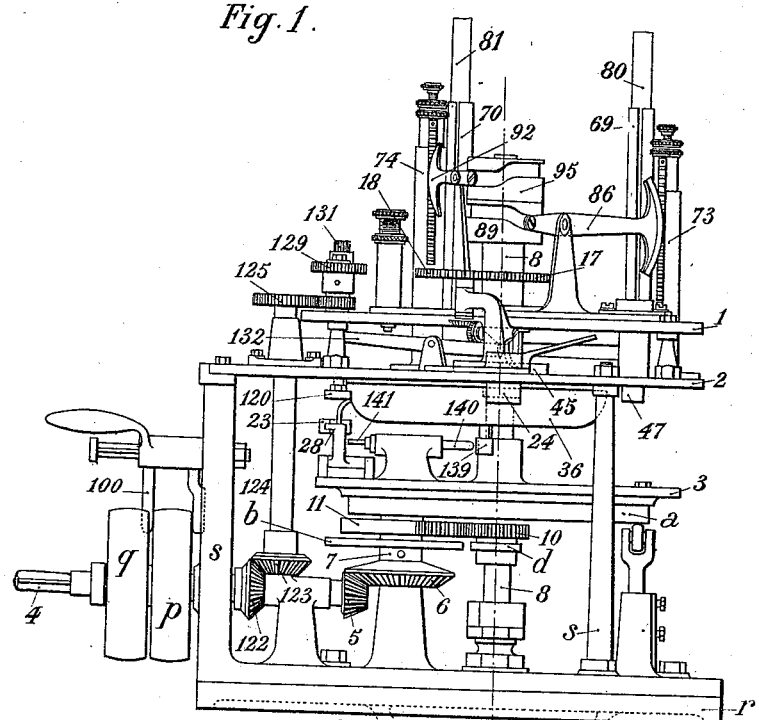

No. 668,906. Patented Feb. 26, 1901.
J. P. DE BRAAM.
MACHINE FOR LOADING CARTRIDGE CASES.
(Application filed Aug. 18, 1899.)
(No Model.) 16 Sheets—Sheet 1.

WITNESSES:
Ella L. Giles

INVENTOR
Jacques Pierre de Braam
BY
Richard
ATTORNEYS

No. 668,906. Patented Feb. 26, 1901.
J. P. DE BRAAM.
MACHINE FOR LOADING CARTRIDGE CASES.
(Application filed Aug. 18, 1899.)
(No Model.) 16 Sheets—Sheet 2.
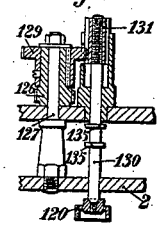
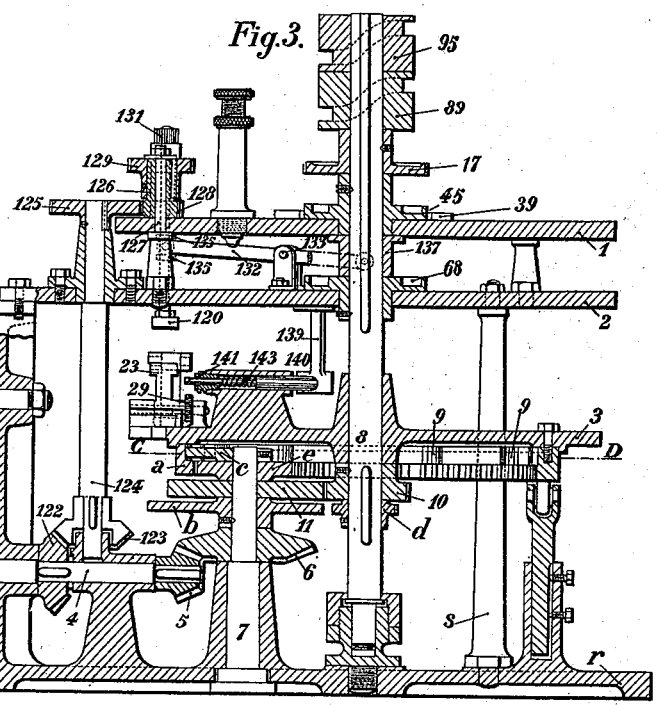
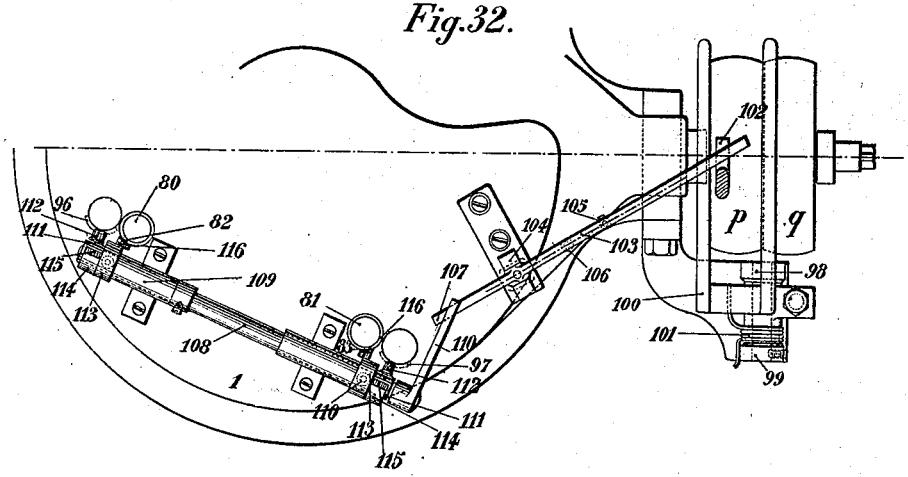
WITNESSES:
Ella L. Giles
INVENTOR
Jacques Pierre de Braam
BY
Richards
ATTORNEYS No. 668,906. Patented Feb. 26, 1901.
J. P. DE BRAAM.
MACHINE FOR LOADING CARTRIDGE CASES.
(Application filed Aug. 18, 1899.)
(No Model.) 16 Sheets—Sheet 3.

WITNESSES:
Ella L. Giles

INVENTOR
Jacques Pierre de Braam
BY
ATTORNEYS

No. 668,906. Patented Feb. 26, 1901.
J. P. DE BRAAM.
MACHINE FOR LOADING CARTRIDGE CASES.
(Application filed Aug. 18, 1899.)
(No Model.) 16 Sheets—Sheet 4.

WITNESSES:
Ella L. Giles

INVENTOR
Jacques Pierre de Braam
BY
Richardson
ATTORNEYS

No. 668,906. Patented Feb. 26, 1901.
J. P. DE BRAAM.
MACHINE FOR LOADING CARTRIDGE CASES.
(Application filed Aug. 18, 1899.)
(No Model.) 16 Sheets—Sheet 5.

WITNESSES:
Ella L. Giles

INVENTOR
Jacques Pierre de Braam
BY
Richardo
ATTORNEYS

No. 668,906. Patented Feb. 26, 1901.
J. P. DE BRAAM.
MACHINE FOR LOADING CARTRIDGE CASES.
(Application filed Aug. 18, 1899.)
(No Model.) 16 Sheets—Sheet 6.

WITNESSES:
Ella L. Giles

INVENTOR
Jacques Pierre de Braam
BY
ATTORNEYS

No. 668,906.　　　　　　　　　　　　　　　Patented Feb. 26, 1901.
J. P. DE BRAAM.
MACHINE FOR LOADING CARTRIDGE CASES.
(Application filed Aug. 18, 1899.)
(No Model.)　　　　　　　　　　　　　　　　　　　　16 Sheets—Sheet 7.
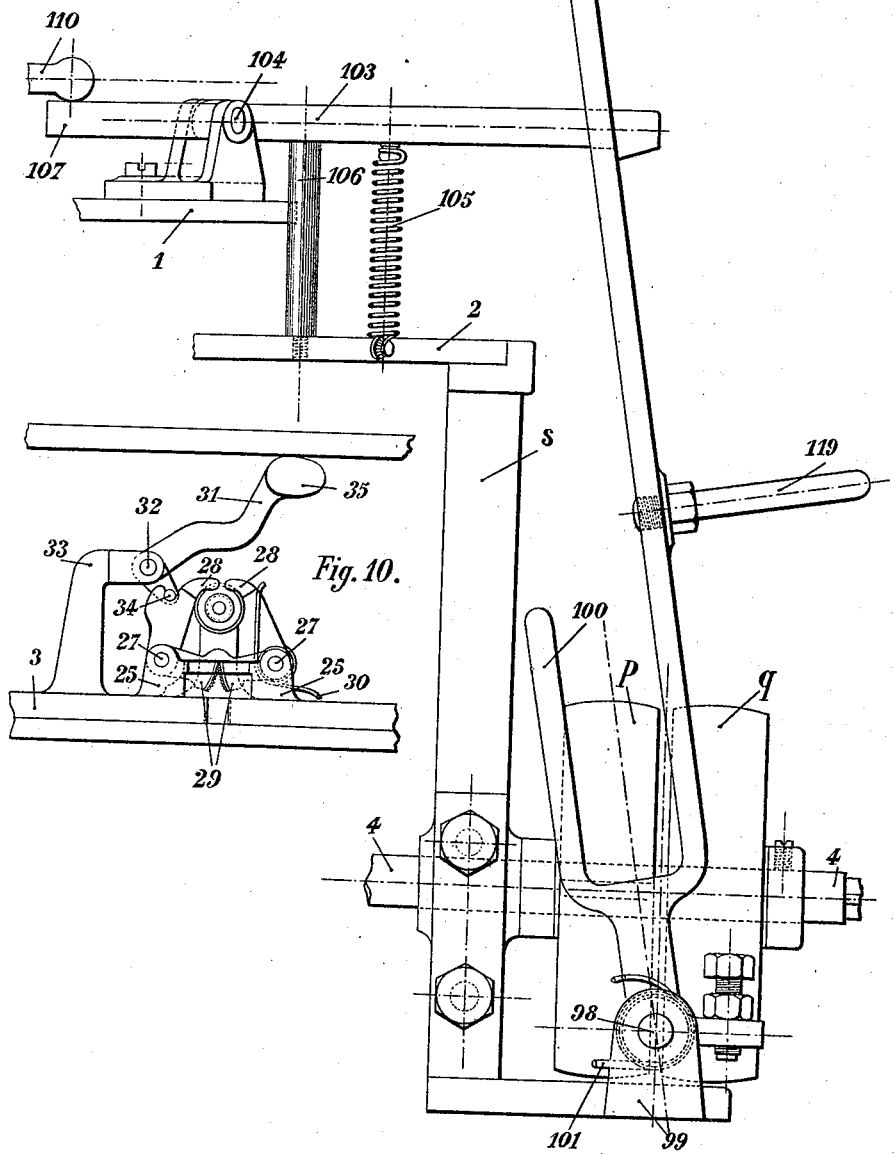

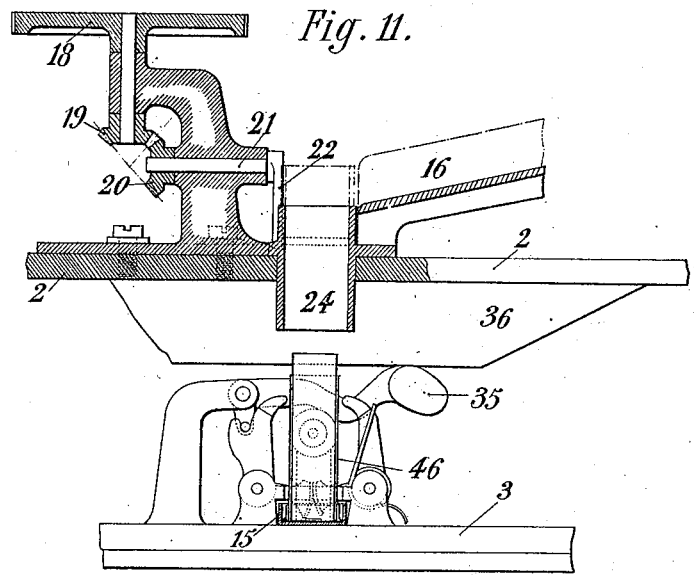
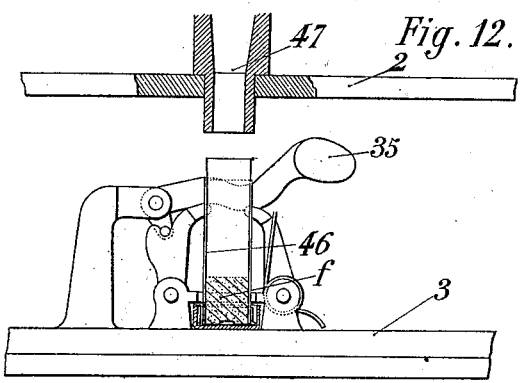
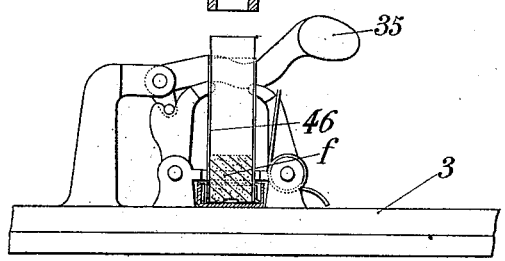

No. 668,906. Patented Feb. 26, 1901.
J. P. DE BRAAM.
MACHINE FOR LOADING CARTRIDGE CASES.
(Application filed Aug. 18, 1899.)
(No Model.) 16 Sheets—Sheet 9.
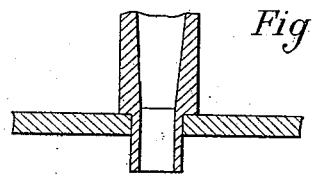
Fig. 14.
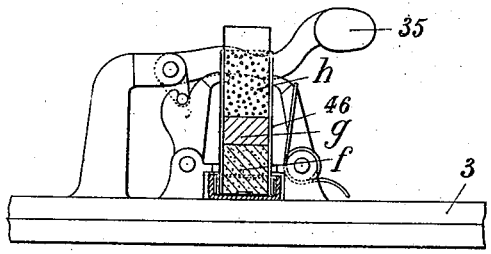
Fig. 15.
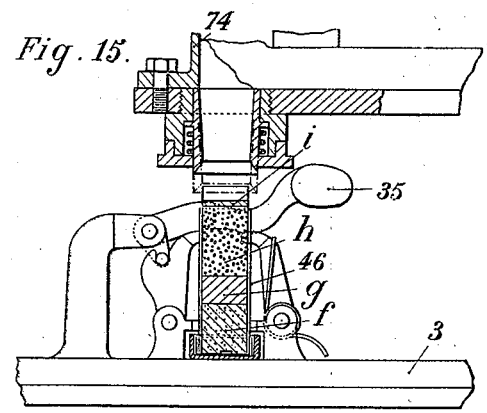
Fig. 16.
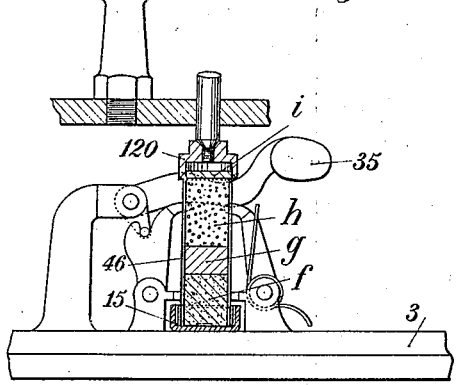
WITNESSES:
Ella L. Giles
INVENTOR
Jacques Pierre de Braam
BY
Richard
ATTORNEYS No. 668,906. Patented Feb. 26, 1901.
J. P. DE BRAAM.
MACHINE FOR LOADING CARTRIDGE CASES.
(Application filed Aug. 18, 1899.)
(No Model.) 16 Sheets—Sheet 10.

WITNESSES

INVENTOR
Jacques Pierre de Braam
BY
ATTORNE

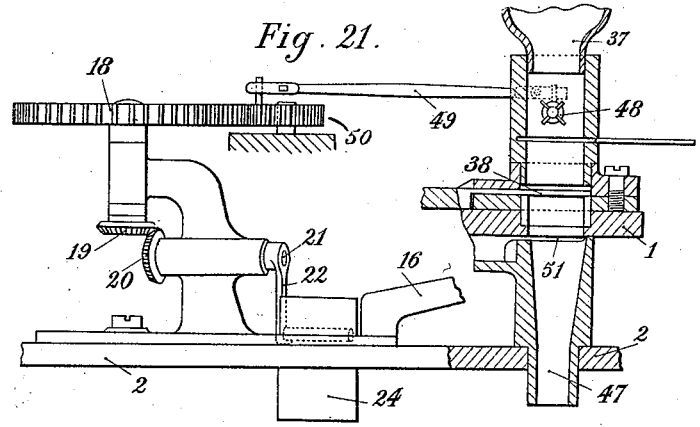
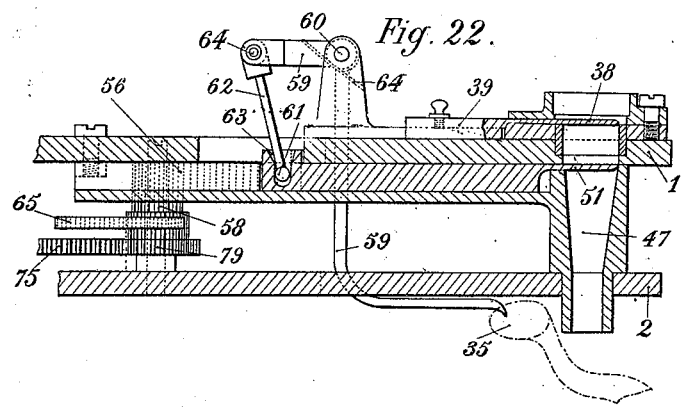
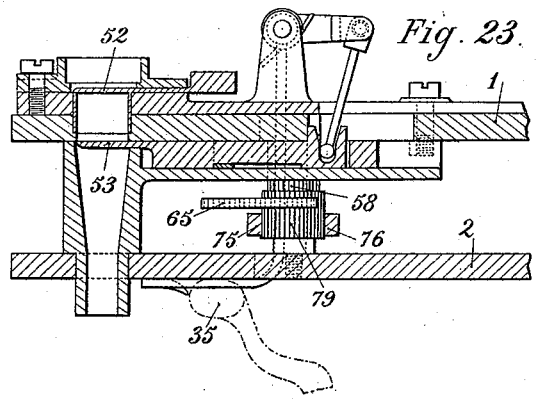

No. 668,906. Patented Feb. 26, 1901.
J. P. DE BRAAM.
MACHINE FOR LOADING CARTRIDGE CASES.
(Application filed Aug. 18, 1899.)
(No Model.) 16 Sheets—Sheet 13.
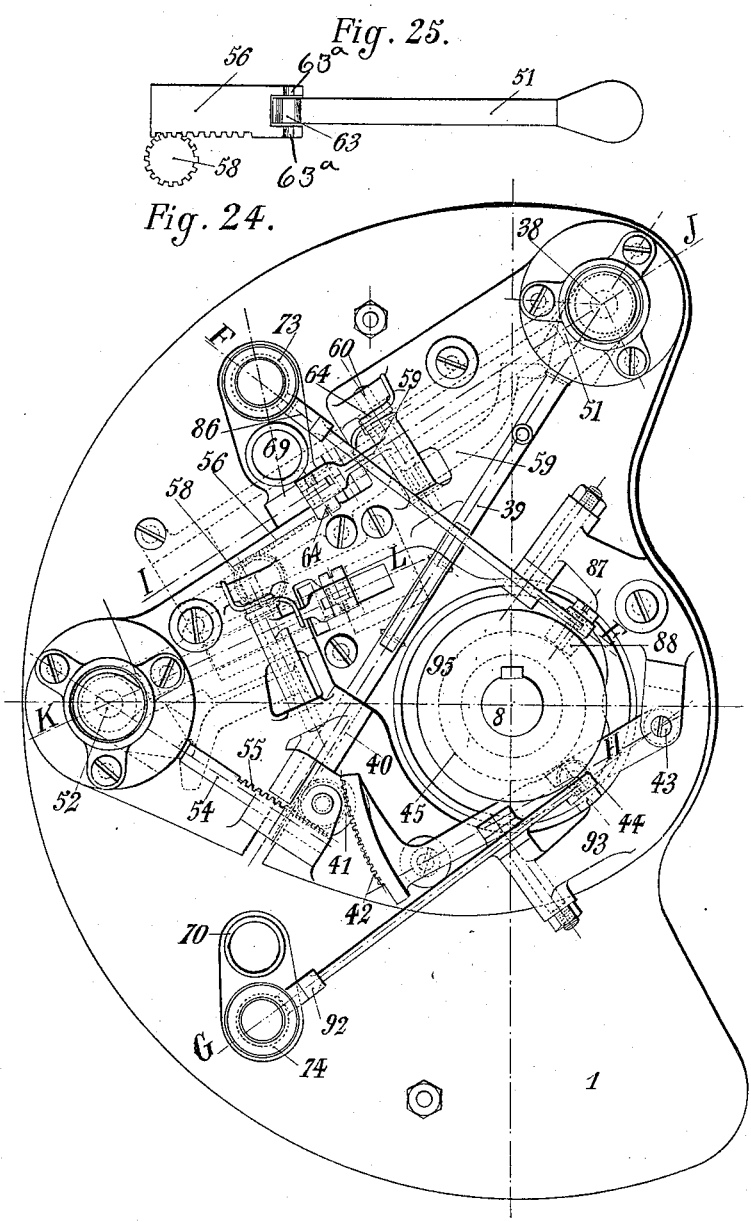

No. 668,906. Patented Feb. 26, 1901.
J. P. DE BRAAM.
MACHINE FOR LOADING CARTRIDGE CASES.
(Application filed Aug. 18, 1899.)
(No Model.) 16 Sheets—Sheet 14.

WITNESSES:
Ella L. Giles

INVENTOR
Jacques Pierre de Braam
BY
Richardson
ATTORNEYS

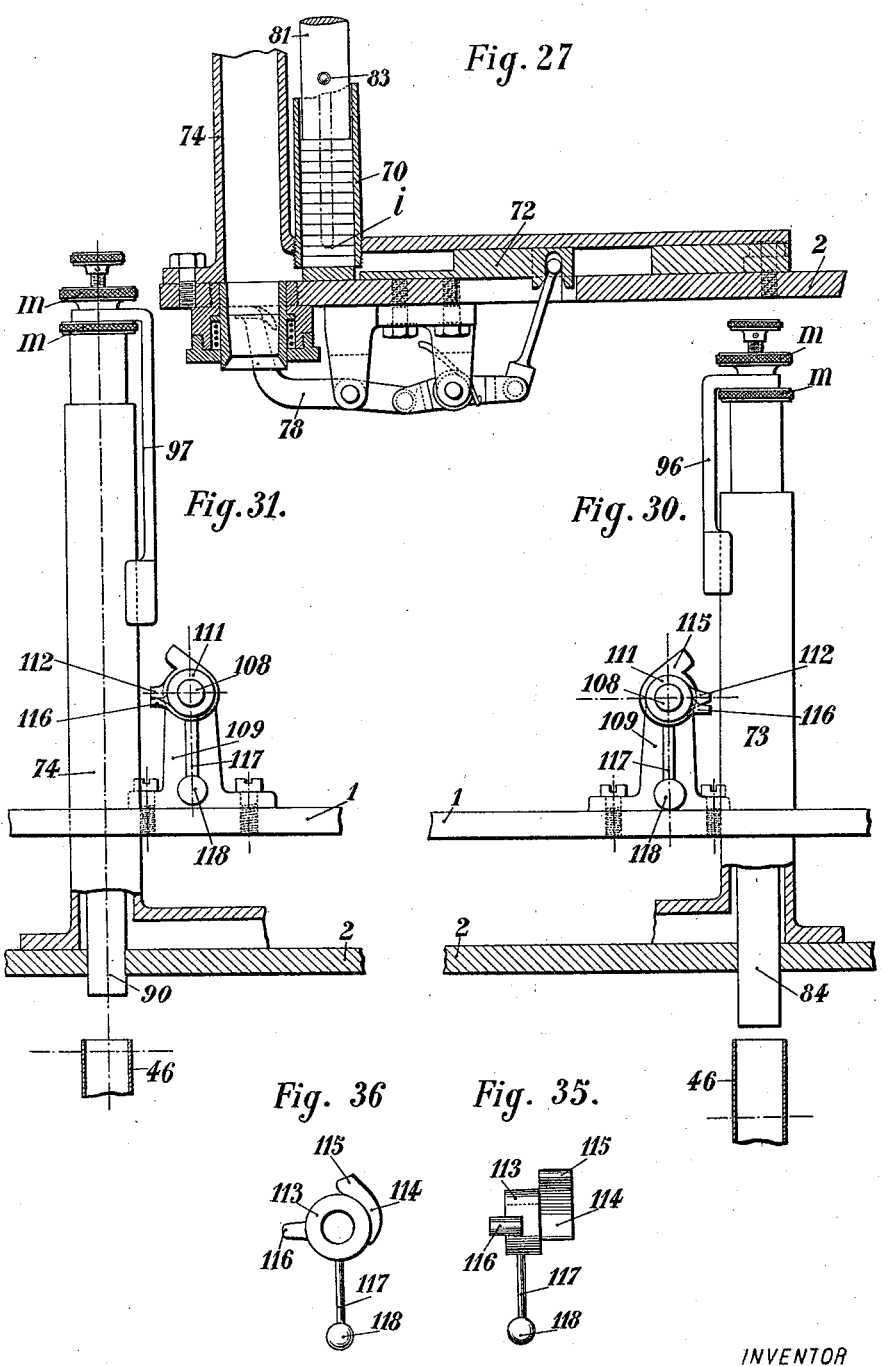

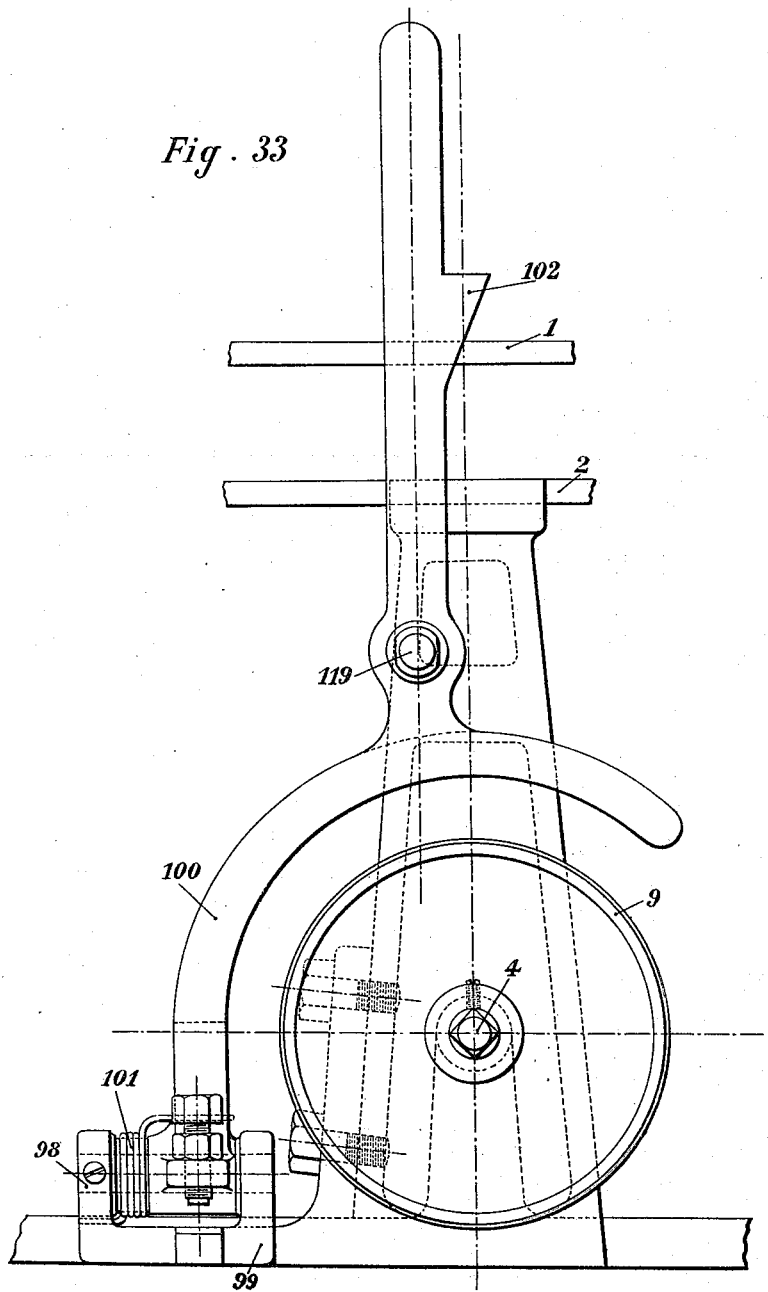

UNITED STATES PATENT OFFICE.

JACQUES PIERRE DE BRAAM, OF PARIS, FRANCE.

MACHINE FOR LOADING CARTRIDGE-CASES.

SPECIFICATION forming part of Letters Patent No. 668,906, dated February 26, 1901.

Application filed August 18, 1899. Serial No. 727,701. (No model.)

*To all whom it may concern:*

Be it known that I, JACQUES PIERRE DE BRAAM, of 27 Rue Hamelin, Paris, in the Republic of France, have invented certain new and useful Improvements in Machines for Loading Cartridge-Cases, of which the following is a specification.

The machines that have hitherto been constructed for loading the cases of sporting-cartridges have fulfilled only very imperfectly the object for which they have been intended, which is to effect mechanically the following operations: The cases which are distributed by the operator or are brought to the machine by an inclined plane receive successively, first, a charge of powder; second, a powder-wad; third, a charge of shot; fourth, a shot-wad; finally, fifth, the edge of the cartridge-case is crimped, so as to close or fasten the case, and, sixth, the finished cartridge is expelled from the machine. All the existing machines, therefore, finish a cartridge in seven steps, which correspond to the introduction of a case into a receiving device in which it is conducted successively under the devices that effect at each succeeding step one of the six operations hereinbefore enumerated.

The essential devices constituting the improved machine hereinafter described have the same functions as the corresponding parts of the known machines; but the improvements that I have invented enable the following new effects to be produced:

First. The special device intended for receiving and retaining the cases is such that it will adapt itself to cases of various calibers which can be loaded by one and the same machine.

Second. The device for retaining the case automatically throws out of gear all the devices for distributing powder, shot, and wads when it is not provided with a case, the consequence of which is to prevent all loss of material and any injury to the machine when by inadvertence, by negligence, or from any other cause the distribution of cases is interrupted.

Third. The manufactured cartridge is necessarily and exactly in agreement with the requirements—that is to say, the charges of powder and of shot, as well as the wads, occupy in the case exactly the space and the place that have been assigned to them. In order to obtain the best result, the importance of which is evident, I cause a lever for stopping the machine to be acted upon by the wad-driving pistons and one of the devices of the wad-distributer. It results from this that if in consequence of an insufficient charge of powder or of shot one of the wad-driving pistons makes a longer movement than that assigned to it in order that the cartridge may be regular the machine is automatically stopped. The same effect is produced when the provision of wads runs short.

In order that the particular means that I employ to attain the results that I have just enumerated may be fully understood, I will now describe the machine represented in detail in the accompanying drawings, whereof—

Figure 2:
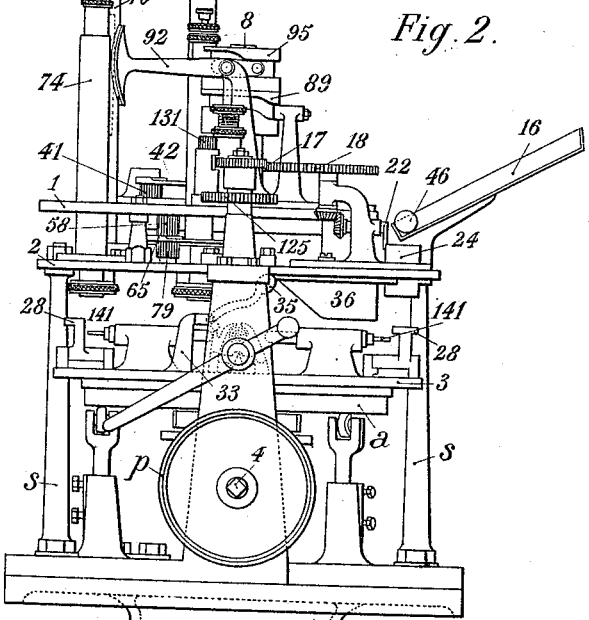
Figure 4:
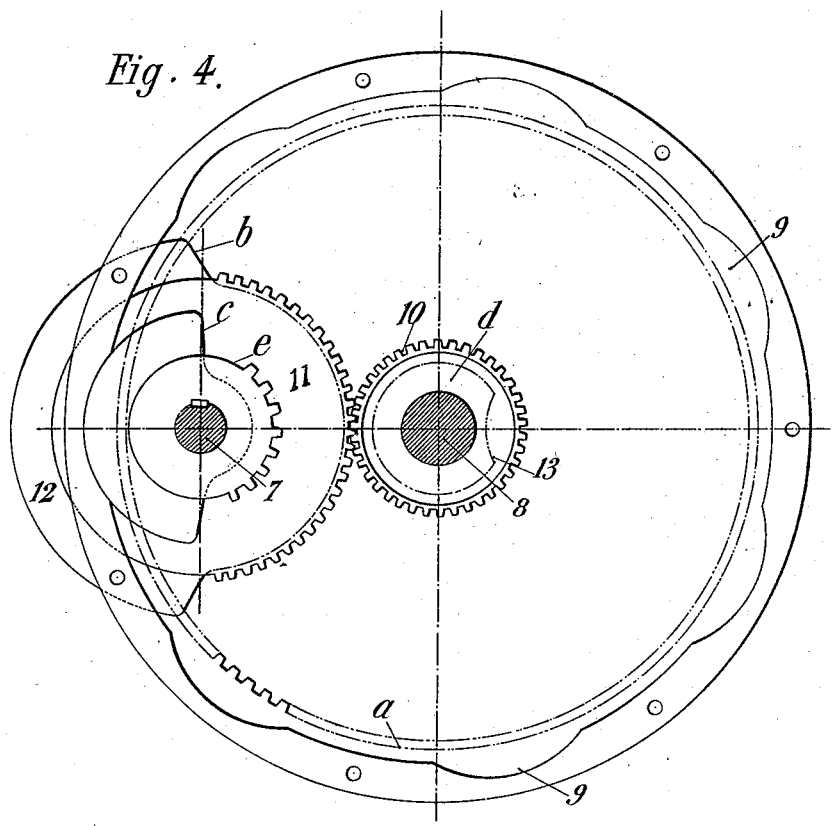
Figure 5:
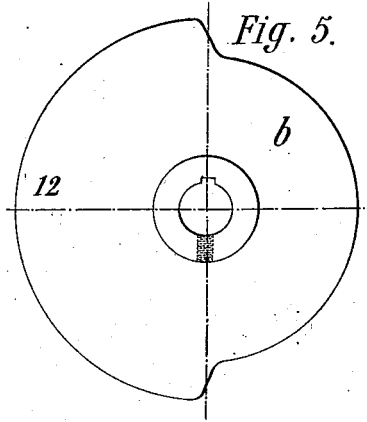
Figure 6:
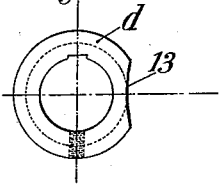
Figure 7:
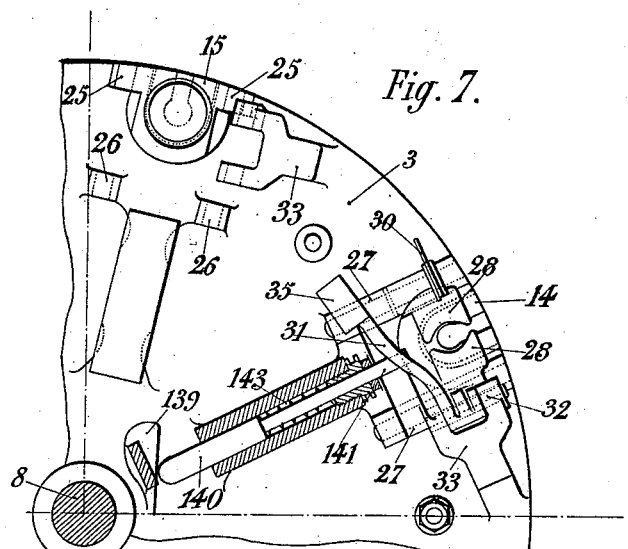
Figure 28:
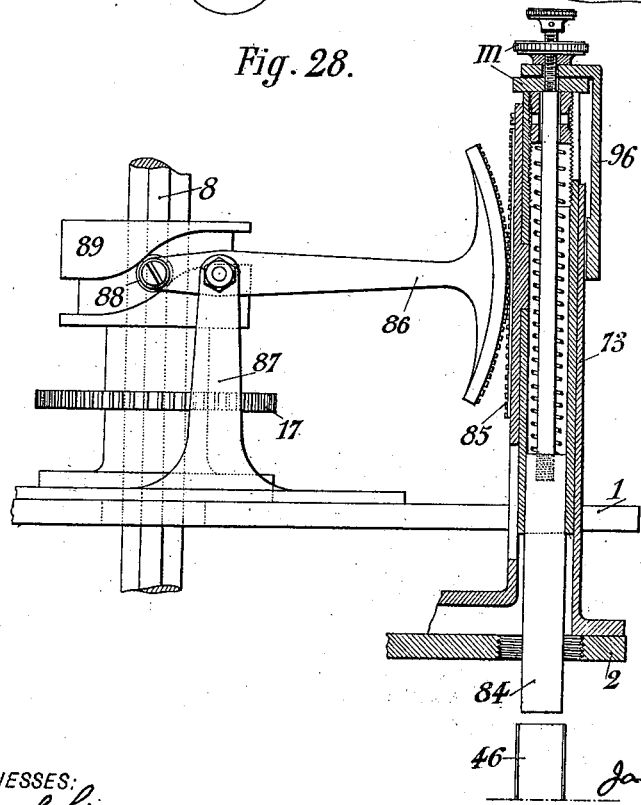
Figure 8:
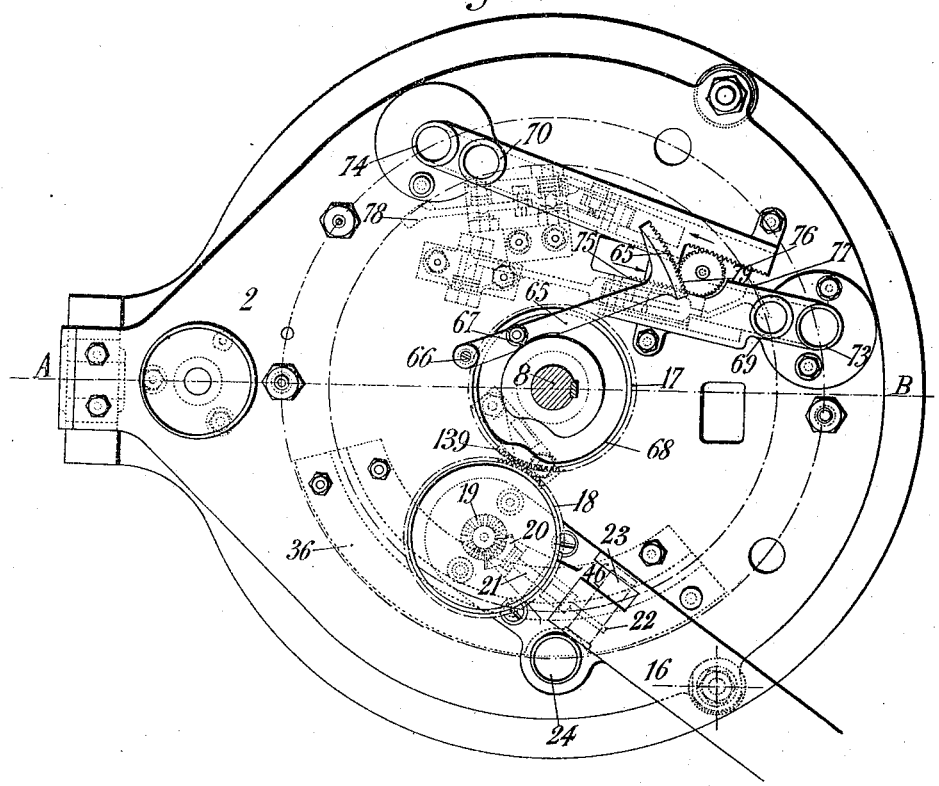
Figure 29:
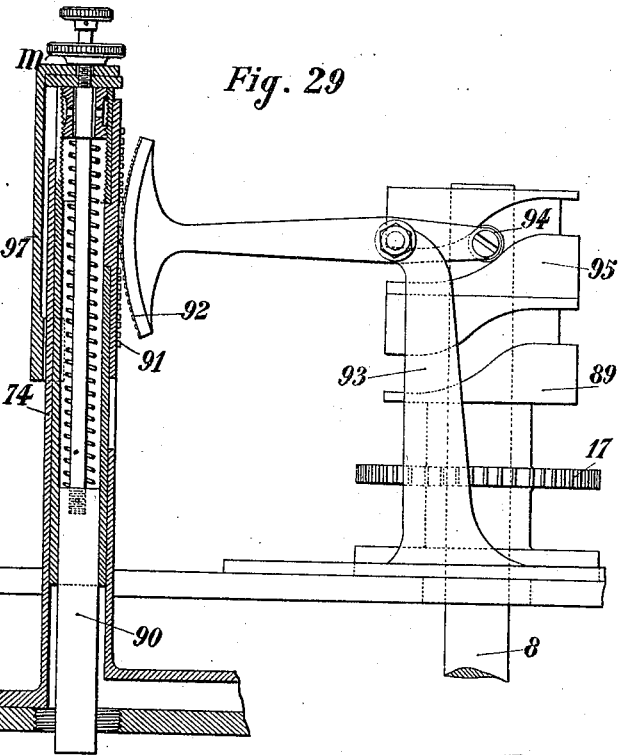
Figures 9, 18:
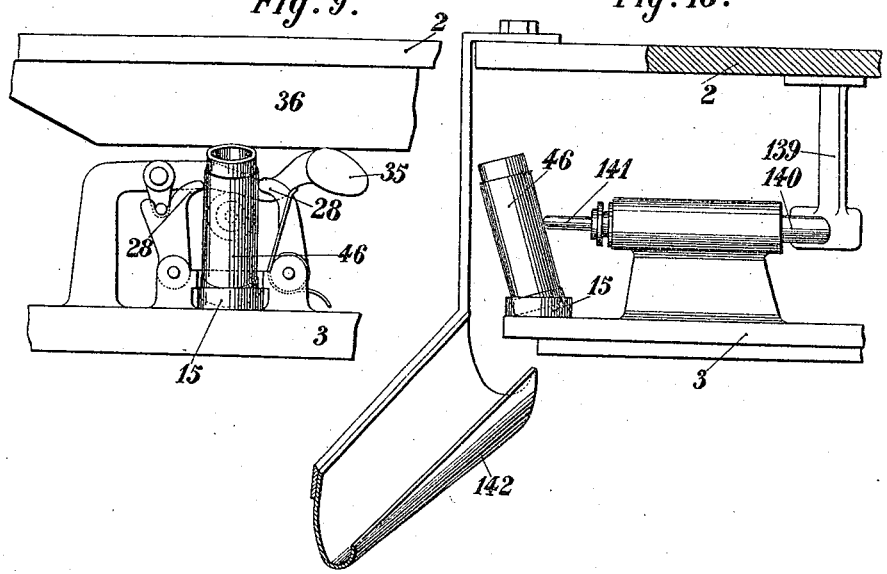
Figure 19:
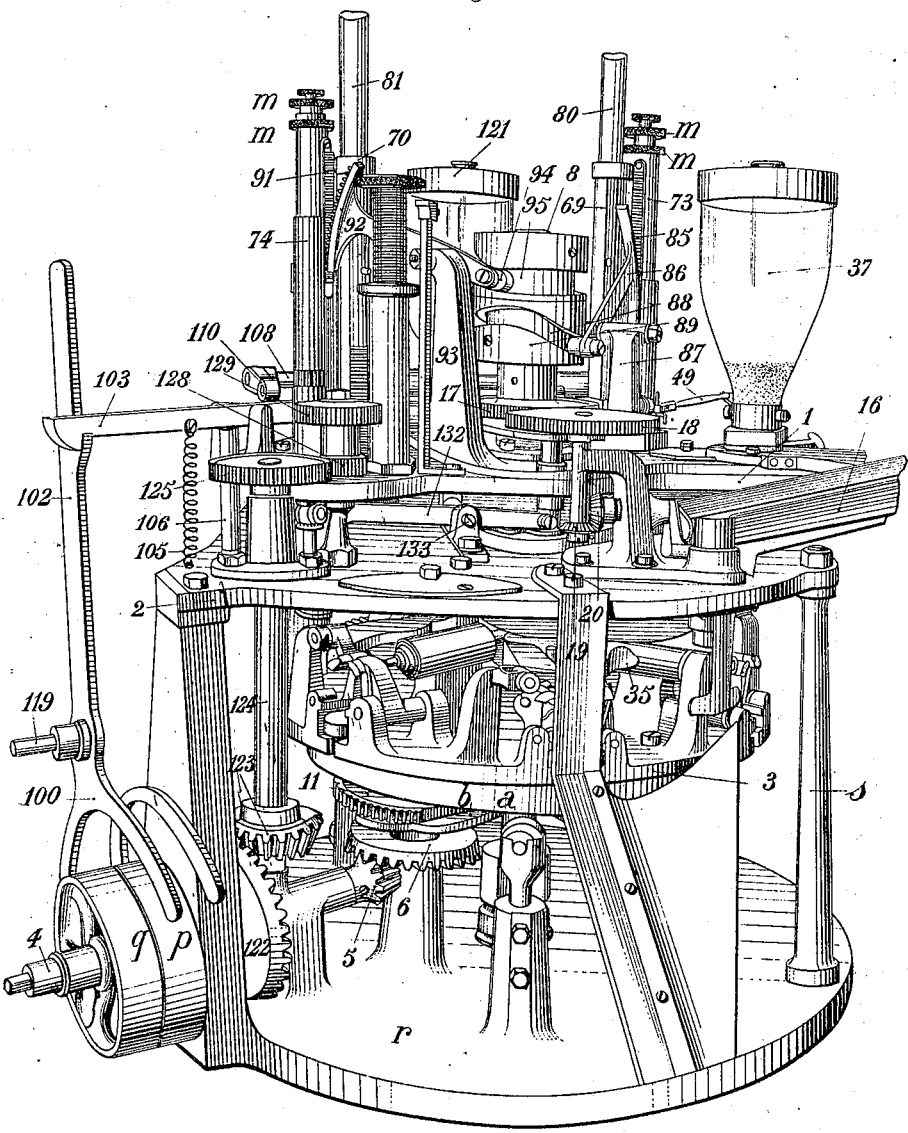
Figure 20:
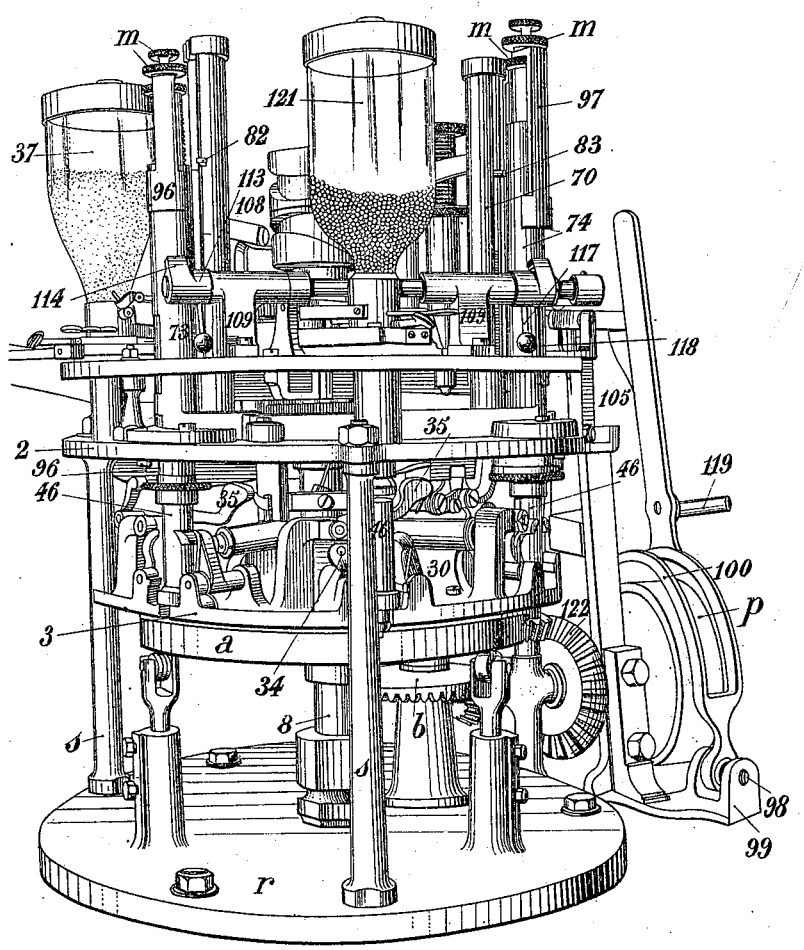
Figure 37:
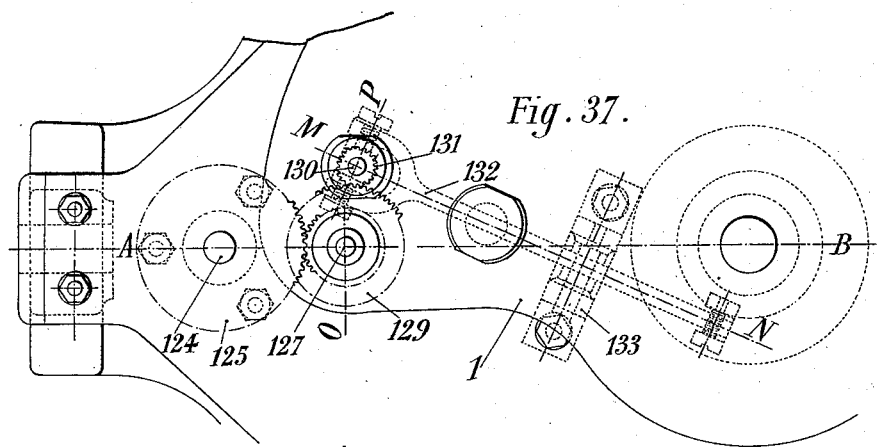
Figure 38:
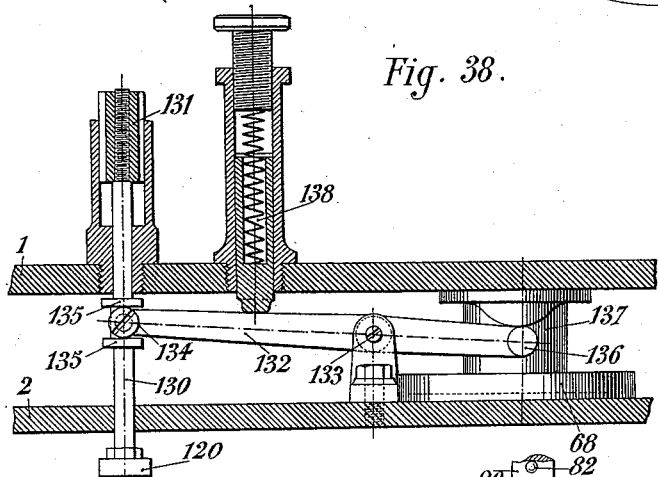
Figure 26:
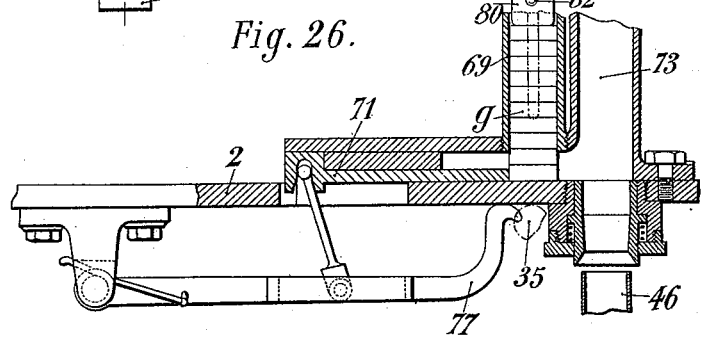

Figure 1 is a diagrammatic view of the machine reduced to its principal parts. Fig. 2 is a corresponding side view. Fig. 3 is a section, on a larger scale, along line A B of Fig. 2. Fig. 4 is a sectional plan, on a larger scale, along C D of Fig. 3, showing the details of the transmission of the movement of plate 3, which carries the special receiving and holding parts for the shells. Figs. 5 and 6 are detail plans of the cam $b$ and the disk $d$, which are keyed, respectively, on the shafts 7 and 8 and which serve to assure the intermittent stop of the shaft 8. Fig. 7 is a partial top plan of the plate 3 which carries the special parts for holding the shells. This figure shows in section the ejector which serves to throw out the finished cartridge from the apparatus. Fig. 8 is a detail plan of the fixed plate 2. Fig. 9 is a detail elevation showing the shell-holding organ, the disengaging-finger lowered by the cam 36 of plate 2, and the finished cartridge 46 subjected to the action of the ejector which throws it out of the machine. Fig. 10 is a detail elevation of the part receiving and holding the shells in the position which is occupied by its different pieces before a shell is taken in or which they assume when the shell has not fallen into the receiving-bucket intended to receive them. Fig. 11 is a detail in longitudinal section of the shell-distributer fixed on plate 2 and showing an empty shell just expelled from the inclined plane 16 into the bucket 15, (first action.) Fig. 12 is a detail showing in sectional elevation the shell seized in the claws 28 in its passage under the powder-distributer, (second action.) Fig. 13 is a similar detail showing the passage of the shell under the powder-wads after the wad has been put in, (third action.) Fig. 14 is a similar detail showing the passage of the shell under the lead-distributer when the shell has received its shot or lead charge $h$, (fourth action.) Fig. 15 is a similar detail showing the passage of the shell under distributer of the lead wads $i$, (fifth action.) Fig. 16 is a similar detail showing the shell with complete charge in its passage under the setter or crimper 120, (sixth action.) Fig. 17 is a detail section along line O P of Fig. 37, showing the setter or crimper and its operating-organs in elevation. Fig. 18 is a lateral elevation of the ejector which throws out from the apparatus the finished cartridges, (seventh action.) Figs. 19 and 20 are views of the two different sides, showing in perspective the general plan of the machine. Fig. 21 is a vertical detail section along the axis of the powder-receptacle 37, showing the actuation of the powder-stirrer 48. Fig. 22 is a normal vertical detail section of Fig. 21, showing the distributing and regulating organs or elements of the powder-charge and their disengagement by the finger or stop dog. Fig. 23 is a similar vertical section to the right of the shot or lead distributer. Fig. 24 is a plan taken from the top of plate 1. Fig. 25 is a detail plan which shows how the tail end of the blade or plate 51 is normally brought together at the fork-shaped extremity of the rack by the horizontal pin 61 on the arm 62. Fig. 26 is a vertical section elevation showing the detail of the powder-wad distributer. Fig. 27 is a similar detail of the shot-wad distributer. Figs. 28 and 29 are vertical section elevations of details showing, respectively, the actuation of the wads for the powder and shot pressers. Fig. 30 is an elevation of the wad-presser for the powder, showing the counter piece or tappet 96, which engages the machine if the travel or stroke of the piston 84 should be too great. Fig. 31 is a similar elevation of the shot-wad press and of the counter piece or tappet 97. Fig. 32 is a detail plan showing the elements which under the action of the tappet-pieces 96 and 97 disengage automatically the machine when the wad-press has too great a stroke. Fig. 33 is a lateral elevation of the guide-fork of the operating-strap of the machine. Fig. 34 is a corresponding rear elevation showing the connections of the fork with the automatic coupling and disengaging elements. Figs. 35 and 36 are details of the coupling or engaging elements. Fig. 37 is a partial detail plan taken over plate 1 and showing the actuation of the crimper or setter 120. Fig. 38 is a section elevation along M N of Fig. 37.

The figures show that the machine comprises three plates 1 2 3—viz., a plate 3 having an intermittent rotary movement, carrying seven identical parts, each of which serves to receive at the first step and to retain during the five succeeding steps a case which is ejected at the seventh step by an ejector, and two fixed plates 1 2. The plate 1 carries the cartridge-cases distributing and filling devices, and serves, with the plate 2, for supporting the mechanism for transmitting movement thereto. All these devices operate while the plate 3 is at rest, and, vice versa, while the plate 3 advances the said devices cease to operate or to produce any useful effect. The fixed plate 2 is carried by columns $s$, fixed to a frame $r$, itself carried by a pedestal $t$.

At the axis of the machine there is arranged a shaft 8, which passes freely through the centers of the plates 1, 2, and 3. This shaft 8, by means of which all the filling devices are actuated, receives an intermittent rotary movement, which alternates with that given to the plate 3. The movement is given to the driving-shaft 4, which carries a fixed pulley $p$ and an adjacent loose pulley $q$, either by hand or by a motor. This movement is transmitted by bevel-pinions 5 and 6 to a shaft 7, Figs. 1 and 3, on which are keyed at suitable levels two partially-toothed pinions $e$ and 11, which are shown in Figs. 1 and 4. The toothed part of the pinion $e$ engages with a toothed ring $a$, fixed to the plate 3, while the toothed part of the pinion 11 engages with a pinion 10, keyed on the shaft 8. When in consequence of the continuous rotary movement of the shaft 7 the teeth of the pinion $e$ engage with the teeth of the ring $a$, the latter rotates. In order that the plate 3 may stop precisely at the instant when the smooth part of the pinion $e$ comes opposite to the teeth of the ring $a$, a cam $c$, keyed on the shaft 7, Figs. 3 and 4, engages in recesses 9, having outlines of the form of arcs of circles made in the ring above the toothed part. The absolute stoppage of the shaft 8 at the moment when the toothed part of the pinion 11 escapes from the teeth of the pinion 10 is insured by a cam $b$, Figs. 3, 4, and 5, the projecting part 12 of which engages in a recess 13 of a disk $d$, Figs. 3, 4, and 6, keyed on the shaft 8. Now that I have indicated how the plate 3 (which carries the seven identical receiving devices) receives an intermittent rotary movement whose periods alternate with the intermittent movements of the shaft 8 (which actuates the distributing and filling devices) I shall describe these devices successively, pointing out the new elements and arrangements that characterize them and enable them to produce the new effects hereinbefore mentioned.

The plate 3 carries seven identical devices for receiving and holding the cartridge-cases. One of these devices is drawn in detail in plan in Fig. 7 and in longitudinal elevation in Fig. 10. The latter figure shows the device as it is before receiving a case. In the general perspective views Figs. 19 and 20 are shown a series of these devices, each furnished with a case after their passage under the case-distributer. In the recesses 14 of the plate 3 are arranged cups 15. A case received in one of these cups is retained by spring-claws that pinch it when it is engaged between them and also operate a disengaging-lever, which acts on the different filling devices when the claws are not sufficiently spread out—that is to say, when a receiving-cup 15 contains no case. It will be seen immediately that these new holding devices enable the caliber of the case to be varied and all distribution of charge (powder, shot, and wads) to be stopped automatically when the machine is not fed with cases. In one with the plate 3 are cast two supports 25 and 26 for two parallel axles 27, Fig. 10, arranged on opposite sides of the recess 14. On each axle 27 is mounted a bent lever, one arm 28 of which ends in the form of a fork or claw, Fig. 7, while the other arm carries a toothed sector 29. The teeth of one of the sectors engage with those of the other. Around one of the axles 27 is coiled a spring 30, which bears with one of its ends on or is attached to the plate 3, while its other end bears against the corresponding claw 28, tending thus constantly to cause the two claws to approach each other. The toothed sectors 29 cause the claws to move in unison. With one of the claws is connected a bent lever 31, the short arm of which engages by means of a pin 34 in a receptacle in the form of a bracket arranged on the left claw. The bent lever is mounted to rock on an axle 32, carried by a support 33, which is cast in one with the plate 3. The free end of the long arm of the lever 31 carries a finger 35. When this finger is lowered, the claws tend to go apart. As a matter of fact the small arm of the angle-lever makes the left claw turn left and that takes along in an inverse movement the opposite claw by the action of the toothed sectors 29. When the claws hold a case between them, the finger 35 is lowered and is thereby held in a determinate position. When there is no case between the claws, the finger rises and touches the plate 2. If the devices for stopping the distribution of powder, shot, and wads are arranged in the path of the finger 35 in such a manner that the latter encounters the said devices when it is in the raised position and passes below them when it is lowered, the distribution will take place regularly when the claws hold a case. It will cease, on the contrary, when for any reason whatever the feeding of cases stops.

I shall now indicate how the various charging and distributing devices act.

Figs. 2 and 8 show, respectively, in elevation and in plan, the inclined plane 16, on which the cases are placed by hand or brought mechanically. Plate 2 carries on its lower face a projection 36, Figs. 1, 2, and 8, which forms a cam and forms inclined planes at its ends. This cam is shown in Fig. 1 in longitudinal elevation, in Fig. 2 in lateral elevation, and in plan and in dotted lines in Fig. 8. It serves to lower at its passage the finger 35, whereby the claws 28 are forced to spread and it becomes possible, first, to expel the finished cartridge which they hold (seventh action) and then to replace it by an empty shell, (first action.) As soon as during the rotary movement of the plate 3 the finger 35 of the lever 31 comes against the said cam the claws commence to open and they remain open until the moment when the finger has quitted the inclined plane that terminates the cam. When they retain at that time a shell received in the meantime, they rest spread open by the shell which is held tight between them. As the claws ought to open to permit the ejector to expel a filled cartridge, as well as to permit the cup 15 after becoming empty to receive a new case, the cam 36 is arranged above and opposite to the case-distributer and to the device that actuates the ejector, (first and seventh steps.)

Fig. 11 shows in detail and in longitudinal sectional elevation the case-distributer fixed to the plate 2. This distributer will be seen, moreover, in plan in Fig. 8, in elevation in Figs. 1 and 2, and in perspective in Fig. 19. On the shaft 8 is keyed a pinion 17, Figs. 1, 2, 3, 8, and 19, which engages with the pinion 18 of the distributer and causes the latter to turn whenever the shaft 8 itself is put into movement. The pinion 18 actuates in its turn the bevel-pinions 19 and 20. The latter is keyed on an axle 21, carrying a bent finger 22, the horizontal bend of which in turning passes into a recess 23, arranged in the end of the inclined plane 16, Fig. 8. The horizontal branch of the finger or lever 22 then encounters the end case in the inclined plane 16, puts it into an upright position, and brings it into the guide-tube 24, whence it falls into the cup 15 to occupy the position indicated clearly at 46 in Fig. 11, (first step.) To each revolution of the plate 3 correspond seven revolutions of the distributer. It follows that each time that a receiving-cup 15 will present itself under the tube 24 a case will fall therein, the claws 28 being opened to allow it to pass, as a result of the action of the cam 36 on the finger 35. As soon as this finger quits the cam the claws again press on the case, the finger 35 remaining thereby sufficiently lowered in order not to encounter the disengaging devices. The shaft 8 remaining at rest, the plate 3 advances by a seventh of a revolution and the case 46, held in the cup 15, presents itself under the powder-distributer, Figs. 12, 19, 21, and 22. The powder escapes through a passage 47, having internally the shape of a conical frustum. It is placed in a reservoir 37, Figs. 19, 20, and 21, at the bottom of which it is agitated by an agitator 48, which receives its movement from a connecting-rod 49, itself actuated by a small pinion 50, which engages with the toothed wheel 18 of the case-distributer, Fig. 21. The distribution of the powder and the distribution of the shot are effected by known means. The charge of powder is regulated between two palettes 38 and 51, Figs. 21 and 22, which are alternately opened and closed. The charge of shot is likewise regulated between two palettes 52 and 53, Fig. 23, that are alternately opened and closed. Fig. 24 shows the means for controlling the two upper palettes 38 and 52. The rods 39 and 54 of these palettes are provided, respectively, at their ends with racks 40 and 55, which engage with the vertical pinion 41, Figs. 2 and 24. This pinion receives its movement from a toothed sector 42, pivoted at 43 to the plate 1 and provided with a roller 44, Fig. 24, on which acts a cam 45, keyed on the shaft 8, Figs. 3 and 24. It is during the passage of the roller 44 in the recess of the cam that the palettes 38 and 52 are successively opened or closed and that the charges of powder and of shot are admitted between the palettes which limit them. The retaining-palettes 51 and 53, the retreat of which allows the charges of powder and of shot, respectively, to escape, are actuated, as is indicated in the plan, Fig. 24 and in Figs. 22 and 23, which are sections, respectively, corresponding to the lines I J and K L of Fig. 24. Instead of being connected directly to their operating-racks 56 and 57, respectively, which receive movement from the vertical pinion 58, the palettes are coupled to the said racks by a coupling which is disengaged when it is actuated by the finger or knob 35 of the bent lever connected to the case-holding claws.

As shown in the detailed plan, Fig. 25, the rack terminates in a fork in which fits the rear end of the palette. A pin 61, Fig. 22, carried by a short rod 62, engages both in a receptacle or recess 63 in the end of the palette and in two recesses in the fork which terminates the rack. The connecting-rod 62 is connected to an axle 64, which is carried by the end of the short arm of the bent disengaging-lever 59. When in consequence of the absence of a case the finger 35, which then is in its raised position, Fig. 10, comes, as indicated in Fig. 22, to abut against the lower end of the bent lever 59, the pin 61 is raised, it escapes from the recess 63ª, Fig. 25, and locates itself in the upper and wider part of recess 63 and the rack 56 and the palette 51 cease to be in rigid connection. It follows that the palette remains fixed, while the rack only is displaced by pinion 58, and the powder instead of escaping remains between the palettes 51 and 38. A spring 64 automatically brings the palette back into engagement with the rack as soon as the finger 35 has abandoned the disengaging-lever 59 and when the recesses 63ª pass under the pins 61 opposite to the latter. As is indicated in Figs. 23 and 24, the arrangement is identically the same for the lower palette 53 of the shot-distributer. The racks 56 and 57, that are coupled with these palettes, engage, moreover, as I have indicated above, with the same vertical pinion 58. The latter receives its movement from a toothed sector 65, which is pivoted at 66 to the plate 2, Fig. 8, and is furnished with a roller 67, actuated by a cam 68, keyed on the shaft 8, Figs. 3 and 8. The case charged with powder, as indicated at $f$ in Fig. 12, immediately presents itself under the powder-wad distributer. The distribution of powder-wads, as well as that of lead-wads, is effected in my improved machine as in the analogous known machines. The wads $g$ $i$, arranged, respectively, in the cylinders 69 and 70, Figs. 26 and 27, are pushed one by one by the wad-drivers 71 and 72 into the adjacent cylinders 73 74, whence they fall into the case to be immediately submitted to the action of a piston, which forms a wad-press, Figs. 28 and 29. Like the palettes 51 and 53 for retaining the charges of powder and lead, the wad-drivers 71 and 72 are not connected rigidly to their operating-racks. As shown in plan in Fig. 8 and in sectional elevation in Figs. 26 and 27, the wad-drivers are connected to their operating-racks 75 and 76 by an engaging and disengaging arrangement in every respect like that which I have hereinbefore described for the palettes 51 and 53 for retaining the charges of powder and of shot, the levers 77 and 78 being always controlled by the finger or knob 35, when the latter, in consequence of the absence of a case, is in its raised position. The wads are therefore distributed only when the claws hold a case.

The racks 75 and 76 for actuating the wad-drivers receive their movement from the vertical pinion 79, which is integral with the pinion 58 and is actuated in consequence at the same time as the latter by the toothed sector 65, Fig. 8. The descent of the wads in the cylinders 69 and 70 is facilitated by the rods 80 and 81, which are loaded with a weight at their free ends. These rods carry, respectively, pins 82 83, each of which slides in a groove in the corresponding cylinder, Figs. 26, 27, and 20, and come, when the provision of wads fails, to act, as I will hereinafter indicate, on the stopping-lever of the machine.

The powder-wad $g$, engaged in the case, as indicated in Fig. 13, is pushed and compressed by the wad-press 84, Figs. 28 and 30. This wad-press carries a rack 85, the teeth of which engage with a sector 86, which is pivoted to a support 87, cast in one with the plate 1, Fig. 19. The free end of the rod of the sector 86 carries a roller 88, controlled by a cam 89, keyed on the shaft 8. The shot-wad press 90, Figs. 29 and 31, likewise receives its movement through the intermediary of a rack 91 and a sector 92, pivoted to a support 93. This sector carries at the end of its rod a roller 94, which is actuated by a cam 95, keyed on the shaft 8. By the milled disks $m$, Figs. 19, 20, 30, and 31, there are fixed, respectively, to the powder-wad press and to the lead-wad press stop-pieces 96 97, the lower end of which, when the wad-press, in consequence of insufficient charge of powder or lead, moves farther than normally, acts upon the disengaging-lever of the machine, a lever which in turn operates upon or releases the belt-shifter and throws the machine out of gear.

The parts for automatic disengagement under the action of the pins 82 83 and the stop-pieces 96 97 are indicated in detail in Fig. 32 in plan, in Figs. 30, 31, and 33 in side elevation, and in Figs. 34 and 20 in rear elevation.

On the axle 98, which turns in a support 99, fixed to the frame of the machine, is mounted a stopping-fork or belt-shifter 100, through which passes the driving-belt of the main shaft 4. A spring 101, coiled around the axle 98, constantly tends to cause the fork to pivot, so as to bring it opposite to the loose pulley $g$. The external branch of the fork 100 carries a tooth 102, Figs. 32 and 33, with which engages the outer end of the long arm of a two-armed lever 103, pivoted at 104 to a support fixed to the plate 1. A spring 105, attached by one of its ends to the long arm of the lever 103 and at its other end to the plate 2, tends to keep the lever in the position of engagement, Fig. 34, in contact with the stop 106. It is clear that if the end 107 of the short arm of the lever 103 is pressed upon it pivots, the fork 100 escapes, and under the action of the spring 101 causes the belt to pass from the fixed pulley $p$ upon the loose pulley $g$. This effect is produced automatically in the following way: A shaft 108, Figs. 30, 31, and 32, is mounted to rotate in pedestals 109, fixed to the plate 1. At the end of the shaft 108 is keyed an arm 110. Opposite to each of the stop-pieces 96 97, controlled by the wad-press, is fixed on the shaft 108 a ring 111, carrying a projection 112. As soon as the base of one of the pieces 96 97 strikes the corresponding projection 112 the shaft 108 rotates and lowers the arm 110, which comes to bear upon the end 107 of the stopping-lever. The pins 82 83 each act indirectly on the corresponding projection 112 through the intermediary of a sleeve 113, represented in detail in Figs. 35 and 36. This sleeve is mounted loosely on the shaft 108 and arranged at one side of the ring 111 in such a manner as to cover this latter by a half-ring 114 integral with it. The nose 115 of this half-ring strikes the projection 112 when the corresponding pin (82 or 83) comes against a lug 116 of the sleeve 113. A rod 117, terminated by a small ball 118, forming a counterweight, forms one with the sleeve 113 and constantly tends to bring the latter back into the position shown in Figs. 30, 31, and 32. The outer branch of the fork 100 carries a lateral projecting arm 119, Fig. 34, which forms an obstacle to the passage of the crank that is mounted on this shaft 4 when instead of operating the machine by a motor it is desired to operate it by hand. In order to start the machine again after having been automatically stopped, it suffices to put the outer branch of the fork into engagement with the lever 103. The case 46, after having successively received the charge of shot $h$, Fig. 14, proceeding from the receptacle 121, Figs. 19 and 20, and the shot-wad $i$, Fig. 15, is brought, by the movement of the plate 3, under the closer or fastener 20. This closer has a continuous rotary movement and an intermittent up-and-down movement, as clearly shown in Figs. 3, 37, 38, and 17.

The bevel-pinion 122, Fig. 3, keyed on the main shaft 4, transmits the rotary movement of the latter through the intermediary of the pinion 123 to a vertical shaft 124. To the upper end of this shaft is keyed a toothed wheel 125. A sleeve 126, which turns freely on an axle 127, carries at its lower end a toothed wheel 128, which engages with the teeth of the wheel 125. On the sleeve 126, thus given a continuous rotary movement, is fixed a pinion 129, which engages with a toothed sleeve 131, fixed to the upper part of the rod 130 of the closer, Fig. 17. A lever 132, pivoted at 133 to a support fixed to the plate 2, is furnished at one of its ends with a fork 134, whose branches, between which passes the rod 130, are held by two collars 135 on this rod. The other end of the lever 132 carries a roller 136, located in the groove of a cam 137, keyed on the shaft 8. It is this cam which during the rotary movement of the shaft 8 causes the return of the closer after its descent occasioned by the spring 138.

The cartridge, loaded and closed, as indicated in Fig. 16, is finally brought by the plate 3 in front of a stop 139, Figs. 3, 7, and 18, which acts on the ejector 140, which the said plate carries opposite to each of the holding devices. At this moment the finger 35 has encountered the projection 36 of the plate 2, Fig. 9, and the claws 28 are opened out. The case, which has become free, is pushed away by the punch 141 and falls into a channel 142, Fig. 18, whence it can be collected by any suitable means. A spring 143, Figs. 3 and 7, brings the piston of the ejector back into its original position as soon as it has escaped from the action of the stop 139. On the succeeding movement of the plate 3 the holding device, whose cup 15 is emptied and whose holding-claws remain opened out while the finger 35 remains under the projection 36, presents itself under the case-distributer, and the cycle of operations described is repeated.

Having now particularly described and ascertained the nature of this invention and in what manner the same is to be performed, I declare that what I claim is—

1. In a machine for loading cartridge-cases, a movable device for holding the cases and provided with folding pieces to receive the shells, distributing mechanism for controlling the supply of ammunition, and means operated by the movement of said folding pieces upon the cessation of the supply of cases to throw said distributing parts out of action, substantially as described.

2. In a machine for loading cartridge-cases, a wad-driver and means operated by the movement of th wad-driver to an abnormal extent, for automatically throwing said machine out of action, substantially as described.

3. In a cartridge-case-loading machine, a movable device for receiving and holding the cases of different calibers comprising a movable plate 3, spring-claws 28 mounted thereon, a lever connected to one of the claws and having a finger 35, a cam 36 for operating said finger, distributing parts for controlling the supply of ammunition and wads, actuating-racks therefor, and means whereby the rising of the jaws couples said distributing parts and their racks, substantially as described.

4. In a cartridge-loading machine the combination with the wad-presses 84, 90 and compression-rods of the wad-columns, of stops 96 and 97 fixed to said wad-presses, stops 82, 83, fixed to said compression-rods and means including a shaft 108 and lever 103 whereby said stops act to disengage the fork of the driving-belt of the machine, substantially as described.

5. In a machine for loading hunting-cartridges, a device for receiving and holding the shells or cases comprising at each side of the receiving bucket or receptacle 15 claws 28, toothed sectors 29 for regulating the movements of these claws, springs 30 which tend constantly to bring said claws toward each other, an angle-lever 31 carried by one of the sectors, a finger 35 carried by one arm of the angle-lever arranged to act upon all distributing elements of the charges and wads, when it is raised owing to the absence of the shell between said claws 28, said finger 35 being lowered for the spreading of the claws 28, when it passes under a cam 36 carried on a fixed plate 2 arranged above the movable plate 3, which carries the receiving and holding parts or elements, substantially as described.

In witness whereof I have hereunto set my hand in presence of two witnesses.

JACQUES PIERRE DE BRAAM.

Witnesses:
EDWARD P. MACLEAN,
ANDRÉ MOSTICKER.